April 5, 1938.                R. W. SHOEMAKER                2,113,499
                              FLOAT FOR AIR VALVES
                              Filed April 18, 1936
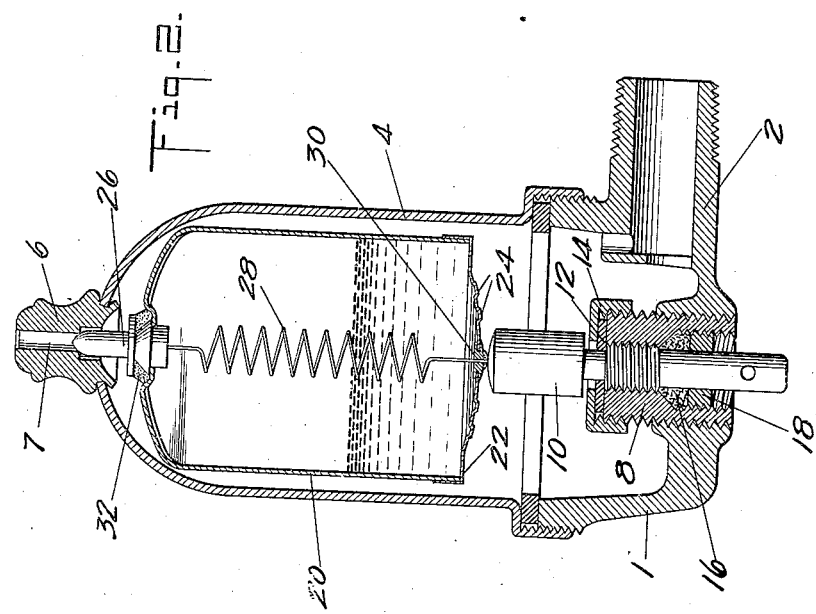
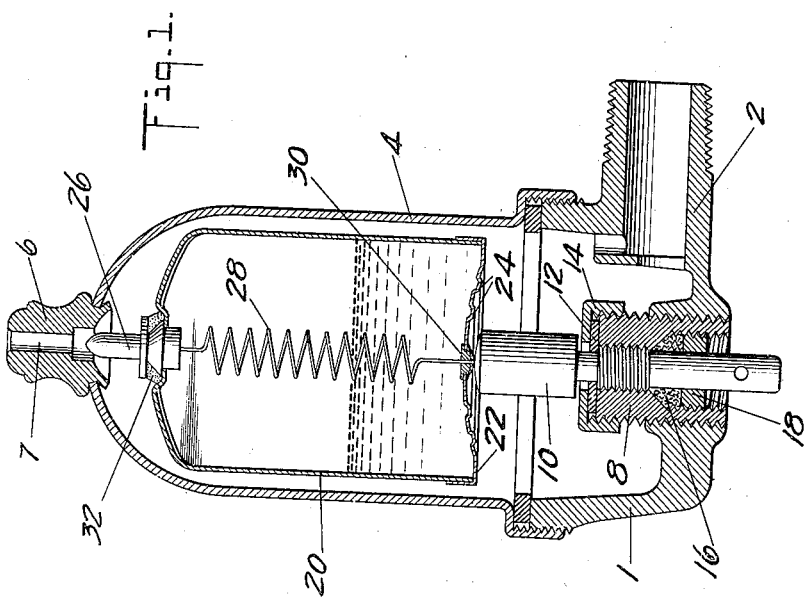
INVENTOR
RICHARD W. SHOEMAKER
BY HIS ATTORNEYS
Howson and Howson Patented Apr. 5, 1938

2,113,499

UNITED STATES PATENT OFFICE

2,113,499

FLOAT FOR AIR VALVES

Richard W. Shoemaker, Woodbury, Conn., assignor to The Chase Companies Incorporated, Waterbury, Conn., a corporation of Connecticut Application April 18, 1936, Serial No. 75,178

1 Claim. (Cl. 236—63)

This invention relates to air valves for heating systems and more particularly to floats for operating the air valves which have a diaphragm forming part of the float wall and it is an object of this invention to provide a means such that the diaphragms can be regulated to react at uniform temperatures and uniformly from time to time. It is also an object of this invention to provide a float having a diaphragm forming a wall thereof and a spring connected to the diaphragm and float casing and under sufficient tension to regulate the operation of the diaphragm.

In the drawing—

Figs. 1 and 2 are views in central vertical section of an air valve having a float constructed in accordance with this invention; Fig. 1 showing the float with the diaphragm as it is when the float is subjected to ordinary temperatures and Fig. 2 showing the float with the diaphragm as it is when the float is subjected to higher or steam temperatures.

In the drawing the invention is shown, for the purpose of illustration, in connection with an air valve for a heating system but it will be understood the invention is not limited to such use. The air valve shown comprises a casing having a cup-shaped base 1 threaded at its upper edge and provided with a threaded tubular projection 2 by which it is secured to an element of a heating system and by which connection is established between the heating system and the interior of the valve casing. Threaded to the base 1 is the inverted cup-shaped upper portion 4 of the casing which is provided with an opening at its upper end in which is secured a valve seat member 6 having a vent opening 7. In an opening in the bottom of the base 1 there is threaded a bushing 8 having a central threaded opening in which a support 10 is adjustably mounted, adjustment of the support being limited by a washer 12 and a cap 14 threaded on the bushing 8. Leakage past the support 10 is prevented by a packing 16 held in place by a threaded gland or follower 18.

Resting upon the support 10 is a float comprising a rigid inverted cup-shaped shell or casing portion 20 having its open lower end closed by a flexible diaphragm 22 concentrically corrugated, as at 24. The upper end of the shell or casing portion 20 is provided with an opening in which is fixed a valve member 26 which seals the opening in the casing portion 20 and cooperates with the valve seat member 6 to control the vent 7 from the valve casing. The float is partly filled with a volatile liquid, such as a mixture of water and alcohol, before sealing so that upon the float being subjected to steam temperature the liquid is vaporized and the pressure within the float increased.

Despite care in manufacture so as to have the diaphragms of the same thickness and quality it has been found extremely difficult to provide diaphragms which will react at uniform temperatures and uniformly from time to time. There is provided, therefore, a spring 28 having one end secured to the valve 26 and thus to the float wall at the opposite end of the float from where the other end of the spring extends through a button 30 in the diaphragm 22 and is soldered in position after the tension of the spring has been adjusted to the desired degree. In constructing the float the spring 28 is attached to the valve, 26, then inserted in the float through the opening which receives the valve and the other end projected through the button 30. The spring is drawn through the button until the desired tension is attained and then soldered and the valve 26 is soldered in position as at 32.

With the spring 28 tensioned between the float wall and the diaphragm 22 and the volatile liquid in the float at a temperature such that it is not volatilized, the float when in position on the support of rest 10 will hold the valve 26 in a position such that the vent 7 from the valve casing through the valve seat 6 is opened, the diaphragm 22 at that time being dished inwardly, as in Fig. 1, to present a concave outer surface. Upon the admission of steam to the heating system, the vent 7 remains open to vent air from the system until the liquid within the float is volatilized by the steam temperature and the diaphragm 22 forced outwardly against the action of the spring 28 and its own inherent resistance from the position shown in Fig. 1 to the position shown in Fig. 2. With the diaphragm in the position shown in Fig. 2 the vent is closed by the valve 26. Providing the spring 28 and adjusting its tension as described permits of adjusting the resistance of the diaphragm to operation by pressure thereon so that its action is substantially uniform from time to time and of making the reactions of a plurality of diaphragms substantially uniform.

Should the valve casing become filled with liquid from the heating system the float will be raised thereby in the usual manner and the vent 7 closed by the valve 26.

What is claimed is:—

A float for air valves comprising a casing having a diaphragm forming a wall thereof, said diaphragm normally presenting a concave outer surface, a valve carried by said casing, a spring secured under tension between said casing and diaphragm and resisting outward movements of said diaphragm and heat responsive means in said casing for operating said diaphragm.

RICHARD W. SHOEMAKER.